United States Patent [19]
Heiskari et al.

[11] Patent Number: 5,901,342
[45] Date of Patent: May 4, 1999

[54] ESTABLISHMENT OF A CALL IN A MOBILE COMMUNICATION SYSTEM

[75] Inventors: Mika Heiskari, Liminka; Mika Lehmusto, Kerava; Hannu Töyrylä, Vantaa, all of Finland

[73] Assignee: Nokia Telecommunications Oy, Espoo, Finland

[21] Appl. No.: 08/737,726

[22] PCT Filed: May 18, 1995

[86] PCT No.: PCT/FI95/00267

§ 371 Date: Nov. 19, 1996

§ 102(e) Date: Nov. 19, 1996

[87] PCT Pub. No.: WO95/32589

PCT Pub. Date: Nov. 30, 1995

[30] Foreign Application Priority Data

May 19, 1994 [FI] Finland ...................................... 942332

[51] Int. Cl.⁶ ...................................................... H04B 7/26
[52] U.S. Cl. .......................... 455/11.1; 455/509; 455/514
[58] Field of Search ............................ 455/11.1, 15, 422, 455/450, 452, 453, 455, 507, 509, 514, 516, 524; 370/315, 327, 329

[56] References Cited

U.S. PATENT DOCUMENTS 3,745,462 7/1973 Trimble ................................... 455/11.1
5,133,080 7/1992 Borras ........................................ 455/15
5,254,986 10/1993 DeLucas ............................. 340/825.44

FOREIGN PATENT DOCUMENTS

86/03635 6/1986 WIPO .
95/15666 6/1995 WIPO .

*Primary Examiner*—Thanh Cong Le
*Attorney, Agent, or Firm*—Pillsbury Madison & Sutro LLP

[57] ABSTRACT

The invention relates to a method of establishing a call in a mobile communications system and to a mobile communication system comprising at least one base station, mobile stations communicating with the mobile communication system and marked at least with system addresses, mobile stations communicating on a direct mode channel and marked with direct mode addresses, and at least one repeater station which transmits traffic between said at least one base station and the mobile stations, communicating on the direct mode channel. To provide flexible call setup, the repeater station comprises a conversion table for converting between said system addresses of the mobile stations and said direct mode addresses.

24 Claims, 1 Drawing Sheet

| SYSTEM SIDE 31 | DIRECT MODE SIDE 32 | | | |
|---|---|---|---|---|
| ADDRESS IN SYSTEM 33 | TRANSMISSION FLAG 34 | ADDRESS ON DIRECT MODE CHANNEL 35 | NUMBER OF DIRECT MODE CHANNEL 36 | SPEAKER ON DIRECT MODE CHANNEL 37 |
| | | | | |
| | | | | |
| | | | | |
| | | | | |

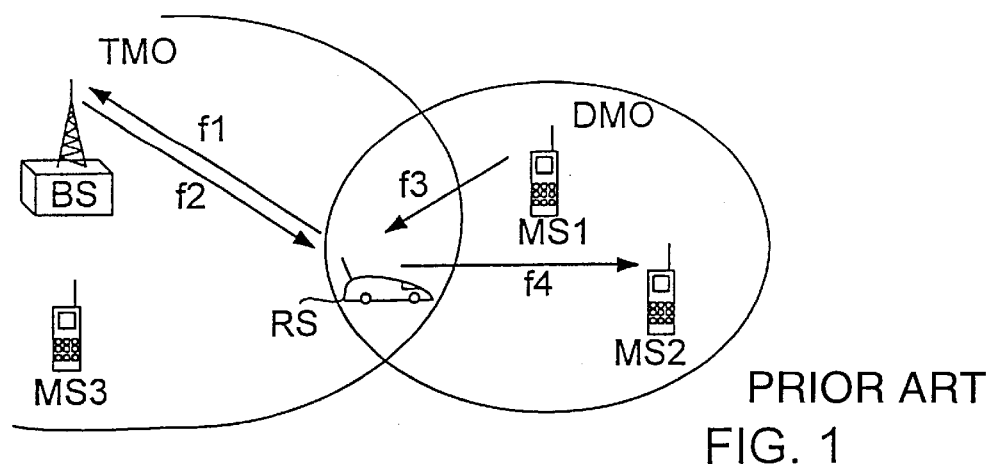
PRIOR ART
FIG. 1
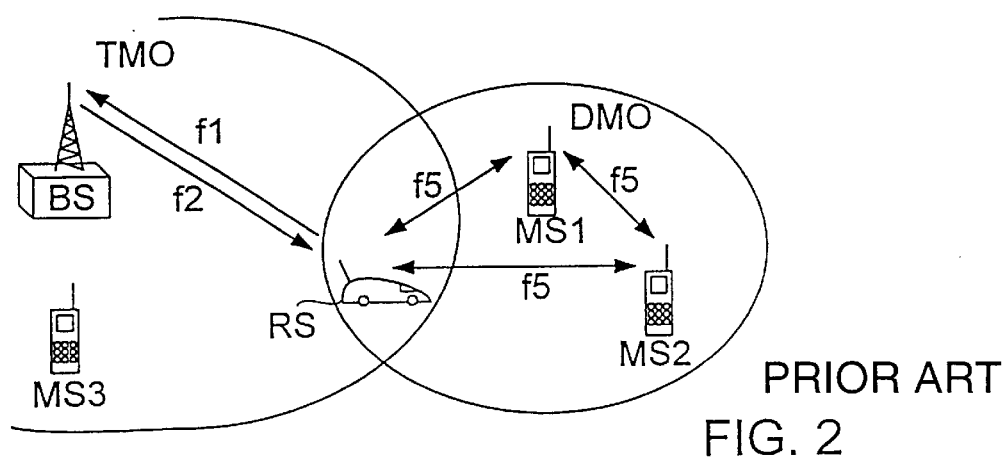
PRIOR ART
FIG. 2
| SYSTEM SIDE 31 | DIRECT MODE SIDE 32 | | | |
|---|---|---|---|---|
| ADDRESS IN SYSTEM 33 | TRANSMIS- SION FLAG 34 | ADDRESS ON DIRECT MODE CHANNEL 35 | NUMBER OF DIRECT MODE CHANNEL 36 | SPEAKER ON DIRECT MODE CHANNEL 37 |
| | | | | |
| | | | | |
| | | | | |
| | | | | |
FIG. 3

ESTABLISHMENT OF A CALL IN A MOBILE COMMUNICATION SYSTEM

FIELD OF THE INVENTION

The invention relates to a method of establishing a call in a mobile communication system comprising at least one base station, mobile stations communicating with the mobile communication system and marked at least with system addresses, mobile stations communicating on a direct mode channel and marked with direct mode addresses and system addresses, and at least one repeater station, which transmits traffic between said at least one base station and the mobile stations communicating on the direct mode channel.

BACKGROUND OF THE INVENTION

The invention relates to mobile telephone systems. A subscriber of a mobile telephone system, i.e. a mobile station, such as a radio phone or some other means of communication, may be registered in a radio network or system through system or traffic channels maintained by the base stations of the radio network.

Apart from system channels of mobile telephone systems, direct mode channels can also be used, i.e. direct mode operation can be applied. Mobile stations using direct mode operation do not communicate directly with a radio network or its base stations. Direct mode channels are frequencies at which mobile phones or other means of communication are able to communicate directly with one another without the system.

Direct mode channels are typically used in cases where e.g. a plural number of hand-portable phones communicate with one another at such a distance from the base station that system channels cannot be used.

Direct mode channels are also useful in the addition of capacity when traffic increases rapidly in one part of the service area of the system, e.g. at one point of the radio network.

A direct mode channel is also called a direct or simplex channel, or a simplex connection. A direct mode channel is a channel that is typically not used by the system at all. It may be, for example, a channel with the same channel spacing as the channels of the system, e.g. 12.5 kHz or 25 kHz. Of the radio phones operating on the direct mode channel, the transmitting station has tuned its transmitter to the channel and transmits speech or data information. The other radio phones set to direct mode operation have tuned their receivers to the same channel, whereby they are able to receive the transmission directly.

On a direct mode channel, both analogue modulation and digital modulation can be used. A radio phone transmitting on the channel can also send signalling information, such as information about access rights and priorities or about a group operating on the channel. On a direct mode channel, messages can be encrypted, or speech can be transmitted in clear form.

Hand-portable phones used in mobile radio systems have lower transmission power than vehicle-mounted phones due to their having e.g. small power unit capacity and a weaker antenna. On account of this, hand-portable phones have a shorter coverage range than vehicle-mounted phones in mobile telephone systems. Since radio networks functioning as PMR networks used by authorities are usually dimensioned, at least in the countryside, in accordance with the coverage range of vehicle-mounted phones, hand-portable phones are not able to operate on the periphery of or outside the coverage areas of the base stations of a mobile communication system. If, however, hand-portable phones are also to be used on the periphery of the coverage area of base stations, a repeater station, i.e. a repeater radio, should be used for transmitting calls from a hand-portable phone to the mobile telephone system and vice versa.

A repeater station is a means where two radio units are connected to each other. A repeater station forwards the information messages transmitted on a direct mode channel to desired network elements, such as base stations of a radio network, which forward the messages to mobile exchanges of the radio network.

A repeater station on a direct mode channel may operate either in duplex, semi-duplex or one-frequency simplex mode.

FIG. 1 is a diagram illustrating the operation of a repeater station communicating in duplex mode. The repeater station RS sends a transmission at frequency f1 to a base station BS, which sends its own transmission to the repeater station at frequency f2. The repeater station and base station then use trunking mode operation, i.e. TMO. On a direct mode channel, i.e. in direct mode operation DMO, the repeater station RS receives transmissions from mobile stations MS1 at frequency f3, and sends transmissions to mobile stations MS2 at frequency f4. In other words, when the repeater station operates on a direct mode channel in duplex mode, it receives a signal at one frequency f3 and repeats the received signal at another frequency f1. A mobile station MS3 of the mobile communication system is also connected to the base station BS over a radio path, the mobile station having its own system address, such as a telephone number. The mobile station may also have a group call address.

FIG. 2 is a diagram illustrating the operation of a repeater station RS communicating in one-frequency simplex mode. The repeater station RS sends a transmission at frequency f1 to the base station BS, which sends its own transmission to the repeater station at frequency f2. The repeater station and the base station then use trunking mode operation, i.e. TMO. On a direct mode channel, i.e. in direct mode operation DMO, the repeater station RS receives transmissions from mobile stations MS1, MS2 at frequency f5, and sends transmissions to mobile stations MS1, MS2 at the same frequency f5. The mobile stations MS1, MS2 then also communicate with each other on the same direct mode channel f5. The word 'frequency' is used herein either for a frequency or for a channel formed by a frequency and a time slot.

In prior art, a repeater station repeats the calls from the system to a direct mode channel at a predetermined, fixedly programmed direct mode frequency. Likewise, all transmissions from a direct mode channel are repeated to the system, from a predetermined direct mode channel onto a certain system channel. The problem with the repeater station of the prior art is that the repeater station does not make a distinction between different types of calls and between different users. Further, the repeater station of the prior art cannot change the channels and direct mode channels to which calls are transmitted. The problem with the repeater station of the prior art is that it can repeat only fixedly predetermined calls.

BRIEF DESCRIPTION OF THE INVENTION

The object of the invention is to provide a new type of method and repeater station in a mobile communication system for establishing calls in a mobile communication system. The aim is to provide a repeater station in which the problems of the prior art solutions are avoided.

This new type of method of the invention for establishing a call in a mobile communication system is characterized by the following steps: a repeater station receives from said base station a call setup request provided with a system address, and searches a conversion table for the direct mode address corresponding to the system address and for the identifier of the direct mode channel that the desired base station is listening to; and the repeater station establishes a call to the desired mobile station on a direct mode channel marked with said identifier.

The invention also relates to a method for establishing a call in a mobile communication system comprising at least one base station, mobile stations communicating with the mobile communication system and marked at least with system addresses, mobile stations communicating on a direct mode channel and marked with direct mode addresses, and at least one repeater station, which transmits traffic between said at least one base station and the mobile stations communicating on the direct mode channel.

The inventive call setup method is characterized by the following steps: a repeater station receives from a direct mode channel a call setup request provided with a direct mode address, searches a conversion table for the system address corresponding to the direct mode address, and establishes a call, via a base station, to a mobile station marked with said system address.

The invention also relates to a mobile communication system comprising at least one base station, mobile stations communicating with the mobile communication system and marked at least with system addresses, mobile stations communicating on a direct mode channel and marked with direct mode addresses, and at least one repeater station, which transmits traffic between said at least one base station and the mobile stations communicating on the direct mode channel.

The inventive mobile communication system is characterized in that the repeater station comprises a conversion table for converting between said system addresses of the mobile stations and said direct mode addresses.

The invention is based on the idea that the repeater of the mobile communication system comprises a conversion table, which converts the addresses of the mobile stations, e.g. telephone numbers, used in the system to direct mode addresses used on a direct mode channel. The conversion table is also able to select a corresponding direct mode channel for each system address. The conversion table is divided into a system side 31, which comprises the individual and/or group numbers known by the mobile communication system, i.e. an address 33 of a mobile station in the mobile communication system, and a direct mode side 32, which comprises direct mode parameters. The direct mode parameters may contain the individual and/or group numbers of the mobile stations communicating on a direct mode channel, used on a direct mode channel, i.e. the address 35 of the mobile station on a direct mode channel. Further, the direct mode parameters may contain the identifiers of those mobile stations whose traffic is forwarded via a repeater station to the mobile communication system, the parameter then being 'speaker on direct mode channel' 37. The direct mode parameters may also contain the identifier of the direct mode channel used, i.e. a number 36 of the direct mode channel. The direct mode parameters may also contain a transmission parameter, i.e. a transmission flag 34, which indicates whether communication is allowed between a mobile station of the mobile communication system and a mobile station communicating on a direct mode channel, and which also indicates the allowed direction of communication. The direct mode parameters can be modified and/or set by the repeater station. A possible user of the repeater station may modify the parameters through the user interface. One important parameter that may need to be modified is the number 36, i.e. channel or time slot information, of the direct mode channel on which the mobile stations communicating within the coverage area of the repeater station operate. The conversion table of the invention converts the direct mode addresses used on a direct mode channel to system addresses, that is, e.g. to ordinary telephone numbers that are used on the system and traffic channels of the mobile communication system. The conversion table makes it possible for the repeater station to switch a call coming from a certain subscriber of the mobile communication system to a correct, desired subscriber on a direct mode channel. The conversion table also ensures a successful switching in the opposite direction, i.e. from a subscriber on a direct mode channel to mobile stations communicating with the base stations of the mobile communication system.

An advantage of the call setup method and repeater station of this new kind of mobile communication system is that when the table of the invention is used, the repeater station can be configured to operate in many different ways. It may be used as a simple expansion of the coverage area of a hand-portable phone, or as a means through which group call operations using a direct mode channel can also be controlled, in a controlled and many-sided manner, with the terminal equipment of the radio system.

An advantage of the invention is that the conversion table makes it possible for the repeater station to receive even calls other than those provided with its own individual or group address, and to forward such call signals, calls or data either from the system to a direct mode channel or from a direct mode channel to the system.

BRIEF DESCRIPTION OF FIGURES

In the following the invention will be described in greater detail with reference to the attached drawings, in which FIG. 1 is a diagram illustrating the operation of a repeater station communicating in duplex mode, FIG. 2 is a diagram illustrating the operation of a repeater station communicating in one-frequency simplex mode, FIG. 3 is a general view of a conversion table contained in the mobile communication system of the invention.

DETAILED DESCRIPTION OF THE INVENTION

The invention defines a repeater station by means of which the system can provide service in a desired manner on a direct mode channel.

When addresses are used on a direct mode channel, it is possible to use a repeater station of the invention, which communicates both with the system and on a direct mode channel. On both a system channel and a direct mode channel, a system of individual and group addresses must be in use.

The repeater station of the invention also operates in the manner described in FIGS. 1 and 2, but differently from the prior art in that the operation of the repeater station is dependent on the called group or individual number, the calling number and/or the service concerned.

For the system, the repeater station is an ordinary radio phone. The system thus need not know whether or not the radio phone (here a repeater station) transmits the service to a direct mode channel.

The method of the invention can also be applied to vehicle-mounted repeaters, as well as to fixed repeater stations.

FIG. 1 is a diagram illustrating the operation of a repeater station communicating in duplex mode. FIG. 1 has been described in greater detail in the description of the background of the invention.

FIG. 2 is a diagram illustrating the operation of a repeater station communicating in one-frequency simplex mode. FIG. 2 has been described in greater detail in the description of the background of the invention.

FIG. 3 shows a general view of a conversion table used in the mobile communication system of the invention.

In the memory of the repeater station of the invention there are one or more conversion tables according to FIG. 3, the conversion tables being used by the repeater station for transmitting calls from the system to a direct mode channel and vice versa.

A conversion table is not used when a radio phone functioning as a repeater station is in normal mode. The table is activated when the radio phone shifts to repeater mode. The radio phone is shifted from normal mode to repeater mode by the user, e.g. when a hand-portable phone is detached from the holder, or when a suitable switch is pressed, or automatically e.g. in response to an impulse received over the radio path.

In the conversion table, each line determines how a call is transmitted from the system to a direct mode channel and vice versa. There are two sides in the table: system side and direct mode side. The system side comprises the individual and group numbers used in the mobile communication system. The direct mode side comprises the individual and group numbers known on the direct mode channel, i.e. the address on the direct mode channel, the number of the direct mode channel, the identifier of the speaker, and the transmission flag. For the system, the repeater station is a radio phone which identifies certain individual and group numbers. In other words, when the base station of the system calls for a mobile station whose identifier is found in the table.

By the conversion table, the repeater station can thus also convert the addresses of the call signals or data received from one side to defined addresses.

It is also possible to add to the table a column for the service provided, i.e. in addition to the user, it is also possible to select the call to be transmitted, such as an emergency call. This is not shown in FIG. 3.

The alternative indications in the transmission flag shown in FIG. 3 include at least 'both directions will be transmitted', 'will be transmitted to radio system', 'will be transmitted to direct mode channel' and 'will not be transmitted'.

The following is a description of setting up and clearing down a call in a system where a repeater station that transmits traffic between the system and the mobile stations communicating on a direct mode channel is connected to the mobile communication system.

A call is initiated between the system and a repeater station when the system sends a call request to the number of the repeater station defined in the repeater or conversion table. This takes place when a subscriber of the system or an entity external to the system wants to use the system to contact a mobile station communicating on a direct mode channel.

A call is also initiated between the system and a repeater station when speech to be transmitted is received from a direct mode channel, whereby the repeater station detects the traffic and starts repeating it onto a channel of the system so that a base station of the mobile communication system receives the traffic. In order that the speech received from a direct mode channel might initiate a call, the transmission flag in the repeater table must have the indication 'will be transmitted'.

A call is also initiated between the system and a repeater station when a call setup message is received from a direct mode channel. This is an alternative of the above-described situation. Further, a call is initiated between the system and a repeater station when the call is initiated from the repeater station. It is possible that either the user of the repeater station initiates repetition, or repetition is initiated automatically.

A call is cleared when the system clears it down. A call is also cleared when a certain time has passed since the last speech message received from a direct mode channel, or when a call clearing message is received from the direct mode channel. These two are alternative ways of clearing down a call. Naturally, a call is cleared if it is cleared down on purpose from a repeater station.

In the prior art, a repeater station can monitor direct mode channels or tune to direct mode channels and look for an active channel with the highest priority, or the repeater station may listen to a predetermined direct mode channel. When a call between the system and a repeater station is in progress, the repeater station is locked on a defined direct mode channel in the table.

In the following, messages for setting up and clearing down a call are described in a system where a repeater station is connected to the mobile communication system, the repeater station transmitting traffic between the system and the mobile stations communicating on a direct mode channel.

According to the invention, a mobile station, such as a radio phone, can send a repeater station a call setup message, in response to which a call is established between the mobile communication system and the repeater station. The message comprises at least a message identifier, the identifier of the transmitter, and the identifier of the called subscriber of the mobile communication system. A call is thus established between a repeater station and another/other terminal equipment/equipments of the mobile communication system. The message is similar to call setup messages used in the prior art, but the operations initiated by the message in the invention are new.

In addition to the call setup message, a radio phone operating on a direct mode channel can transmit a call clearing message, which clears down a call between a repeater station and the mobile communication system.

The following is a description of speech transmission from the mobile communication system to a mobile station communicating on a direct mode channel.

When a call signal is transmitted from the mobile communication system to a number identified by the repeater station, the station checks the indication on the transmission flag at the line concerned. If the indication is 'will not be transmitted', the repeater station establishes a call, but does not transmit the call to a direct mode channel. The call can be conducted locally from the user interface of the terminal.

If the indication on the transmission flag is 'both directions will be transmitted' or 'will be transmitted to direct mode channel', the call will be repeated to a direct mode channel defined by an individual or group number on the direct mode side of the conversion table. The call to be transmitted is thus addressed to an address defined in the column 'address on direct mode channel' on a direct mode channel defined in the column 'number of direct mode channel'.

In the direction from the system to the direct mode channel, the column 'speaker on direct mode channel' is not used.

The following is a description of how speech is transmitted from a direct mode channel to the mobile communication system.

When a call is in progress, the repeater station listens to a direct mode channel defined in the column 'number of direct mode channel' of its conversion table, and forwards the received speech to the system if the transmission flag has the indication 'both directions will be transmitted' or 'will be transmitted to radio system'. Using the field 'speaker on direct mode channel', it is possible to determine the group of radio phones that transmit speech that is forwarded from a direct mode channel to the system. The field thus comprises a list of radio phones authorized to transmit, or a wild card character, or the field is empty. If the field comprises a wild card character, all speech received from the direct mode channel is transmitted to the system. If the field is empty in this direction, no speech is transmitted.

The field 'address on direct mode channel' is not used when speech is transmitted from a direct mode channel to the system.

In the following, some examples are presented of the use of the conversion table. On a direct mode channel, data, speech and signalling messages are always transmitted on a channel defined in the table selected.

We shall first describe the use of a mobile station on a direct mode channel as a wireless phone, i.e. BASIC CORDLESS operation.

Let us first study a situation where group and individual call signals of one individual mobile station are repeated from the system to a direct mode channel. The operation and settings in the conversion table are then as described below.

A repeater station receives a call signal provided with an address found in the column 'address in system', the address being the individual or group number of one mobile station. The repeater station checks the indication on the transmission flag, which will be either 'both directions will be transmitted' or 'will be transmitted to direct mode channel'. After this, the repeater station sets the address of the individual mobile station defined in the column 'address on direct mode channel' as the address in the call signal or data present on the direct mode channel. The repeater station then locks on the line concerned, i.e. the repeater station does not receive other calls during the connection. After the locking, the repeater station repeats all the traffic transmitted on a direct mode channel by the radio defined in the field 'address on direct mode channel' to the system direction. Simultaneously, the repeater station transmits all data received from the radio system to the direct mode channel, to the address 'number on direct mode channel'.

We shall now study a situation where the group and individual calls of one individual mobile station are repeated from the direct mode channel to the system. The operation of the repeater station and the settings in the conversion table are then as follows. A receiver station receives on a direct mode channel a call signal or data provided with the address found in the column 'address on direct mode channel', the address being the individual or group number of a mobile station. If the transmission flag in the repeater has the indication 'will be transmitted to both directions' or 'will be transmitted to system', a connection is established to the system, setting the address defined in the column 'address in system' as the address of subscriber B. The repeater will then lock on the line concerned, i.e. the repeater station does not receive other calls during the connection, but keeps its transceivers tuned to the channels desired. The repeater then repeats all speech units transmitted by the mobile station defined in the field 'speaker on direct mode channel' to the system direction on a direct mode channel where the address mentioned is the address of an individual mobile station. Finally, the repeater station transmits all data received from the radio system to the direct mode channel, to the address defined in the field 'number of direct mode channel'.

The following is a description of the use of a repeater station in a situation where a group call group is to be expanded to also include mobile stations that communicate on a direct mode channel, i.e. of BASIC TALK GROUP EXPANDER operation.

Let us first study a group call from the system to a direct mode channel. The operation and the settings in the conversion table are then as follows. A repeater station transmits a call or a data message from the system to a group number in the column 'address in system' to a direct mode channel, to a subscriber indicated by the address 'address on direct mode channel'. The transmission flag must then have the indication 'both will be transmitted' or 'will be transmitted to direct mode channel'. During the operation, the repeater locks on the line concerned, i.e. it does not receive other calls during the connection. After this, all data is transmitted from the system to a direct mode channel, provided with the address 'address on direct mode channel'. Then the data transmitted on a direct mode channel by radio phones defined in the column 'speaker on direct mode channel' are transmitted to the radio system.

Let us now study a group call from a direct mode channel to the system. The operation and the settings in the conversion table are then as follows. A repeater station transmits a call or a data message from a direct mode channel to a subscriber of a mobile communication system marked with a group number found in the column 'address on direct mode channel'. The transmission flag in the conversion table must then have the indication 'both will be transmitted' or 'will be transmitted to system'. The repeater then locks on the line concerned, i.e. the repeater does not receive other calls during the connection. All data from the mobile communication system is transmitted to a direct mode channel, provided with the address 'address on direct mode channel'. The data transmitted by those mobile stations on a direct mode channel that are defined in the column 'speaker on direct mode channel' of the line are transmitted to the radio system. This may be effected e.g. by an individual call from the system to a group call in progress on the direct mode channel, or by an individual call from the direct mode channel to a group call in progress in the system.

The drawings and the associated description are only intended to illustrate the idea of the invention. In their details, the method of the invention for establishing a call in the mobile communication system and the mobile communication system of the invention may vary within the scope of the claims. Although the invention is described above mainly with reference to trunking systems, it can also be applied in other kinds of mobile communication systems.

We claim:

1. A method of establishing a call in a mobile communication system comprising:

at least one base station;

a plurality of mobile stations communicating with the mobile communication system and marked at least with system addresses;

a plurality of mobile stations communicating on a direct mode channel and marked with direct mode addresses and system addresses; and at least one repeater station, which transmits traffic between said at least one base station and the mobile stations communicating on the direct mode channel, the method comprising:

a repeater station of said at least one repeater station receiving from a base station of said at least one base station a call setup request provided with a system address;

the repeater station searching in a conversion table for a direct mode address corresponding to the system address and for an identifier of the direct mode channel to which a desired mobile station is listening, the conversion table being divided into a system side, comprising individual and/or group numbers known by the mobile communication system, and a direct mode side, comprising direct mode parameters; and the repeater station establishing a call to the desired mobile station on the direct mode channel marked with said identifier.

2. The method according to claim 1, wherein the repeater station is a radio phone which is shifted from a normal mode to a repeater mode by a user.

3. The method according to claim 1, wherein the radio phone is shifted from a normal mode to a repeater mode by a predetermined event.

4. The method according to claim 3, wherein the predetermined event is an impulse received by the radio phone over a radio path.

5. A method of establishing a call in a mobile communication system comprising:

at least one base station;

a plurality of mobile stations communicating with the mobile communication system and marked at least with system addresses;

a plurality of mobile stations communicating on a direct mode channel and marked with direct mode addresses; and at least one repeater station, which transmits traffic between said at least one base station and the mobile stations communicating on the direct mode channel, the method comprising:

a repeater station of said at least one repeater station receiving from the direct mode channel a call setup request provided with a direct mode address;

the repeater station searching in a conversion table for a system address corresponding to the direct mode address, the conversion table being divided into a system side, comprising individual and/or group numbers known by the mobile communication system, and a direct mode side, comprising direct mode parameters; and the repeater station establishing a call, via a base station of said at least one base station, to a mobile station marked with said system address.

6. The method according to claim 5, wherein the repeater station is a radio phone which is shifted from a normal mode to a repeater mode by a user.

7. The method according to claim 5, wherein the radio phone is shifted from a normal mode to a repeater mode by a predetermined event.

8. The method according to claim 7, wherein the predetermined event is an impulse received by the radio phone over a radio path.

9. A mobile communication system comprising:

at least one base station;

a plurality of mobile stations arranged to communicate with the mobile communication system and marked at least with system addresses;

a plurality of mobile stations arranged to communicate on a direct mode channel and marked with direct mode addresses; and at least one repeater station, arranged to transmit traffic between said at least one base station and the mobile stations arranged to communicate on the direct mode channel, wherein a repeater station of said at least one repeater station comprises:

a conversion table for converting between said system addresses of the mobile stations and said direct mode addresses; and said conversion table being divided into a system side, comprising individual and/or group numbers known by the mobile communication system, and a direct mode side, comprising direct mode parameters.

10. The mobile communication system according to claim 9, wherein said direct mode parameters include the individual and/or the group numbers of the mobile stations arranged to communicate on the direct mode channel.

11. The mobile communication system according to claim 10, wherein said direct mode parameters include a transmission parameter, which indicates whether communication is allowed between a mobile station of the mobile communication system and a mobile station arranged to communicate on the direct mode channel, and which also indicates an allowed direction of communication.

12. The mobile communication system according to claim 10, wherein said direct mode parameters include an identifier of the direct mode channel.

13. The mobile communication system according to claim 9, wherein said direct mode parameters include identifiers of the mobile stations having traffic forwarded via the repeater station to the mobile communication system.

14. The mobile communication system according to claim 13, wherein said direct mode parameters include an identifier of the direct mode channel.

15. The mobile communication system according to claim 13, wherein said direct mode parameters contain a transmission parameter, which indicates whether communication is allowed between a mobile station of the mobile communication system and a mobile station communicating on a direct mode channel, and which also indicates the allowed direction of communication.

16. The mobile communication system according to claim 9, wherein said direct mode parameters include an identifier of the direct mode channel.

17. The mobile communication system according to claim 16, wherein said direct mode parameters contain a transmission parameter, which indicates whether communication is allowed between a mobile station of the mobile communication system and a mobile station communicating on a direct mode channel, and which also indicates the allowed direction of communication.

18. The mobile communication system according to claim 9, wherein said direct mode parameters include a transmission parameter, which indicates whether communication is allowed between a mobile station of the mobile communication system and a mobile station arranged to communicate on the direct mode channel, and which also indicates an allowed direction of communication.

19. The mobile communication system according to claim 9, wherein said direct mode parameters can be modified and/or set by a user of the repeater station.

20. The mobile communication system according to claim 9, wherein said at least one repeater station comprises a radio phone.

21. The mobile communication system according to claim 20, wherein the radio phone is shifted from a normal mode to a repeater mode by a user.

22. The mobile communication system according to claim 20, wherein the radio phone is shifted from a normal mode to a repeater mode by a predetermined event.

23. The mobile communication system according to claim 22, wherein the predetermined event is an impulse received by the radio phone over a radio path.

24. The mobile communication system according to claim 9, wherein said at least one repeater station comprises a vehicle-mounted repeater.

* * * * *